C. R. COLE.
TRANSMISSION.
APPLICATION FILED APR. 20, 1916.

1,241,924.

Patented Oct. 2, 1917.
2 SHEETS—SHEET 1.

WITNESSES

INVENTOR
Chauncey R. Cole
BY
ATTORNEY

C. R. COLE.
TRANSMISSION.
APPLICATION FILED APR. 20, 1916.
1,241,924.
Patented Oct. 2, 1917.
2 SHEETS—SHEET 2.
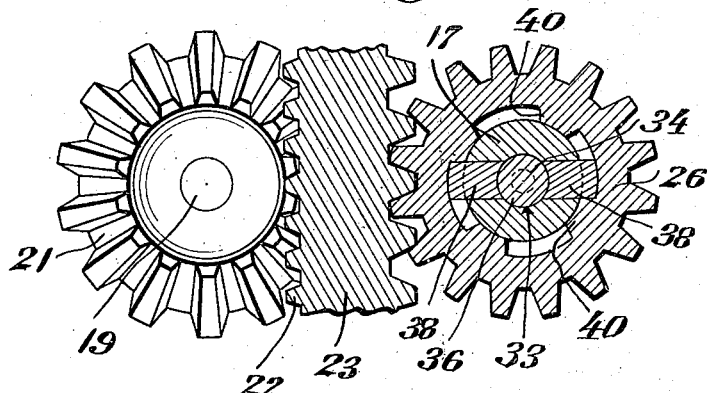
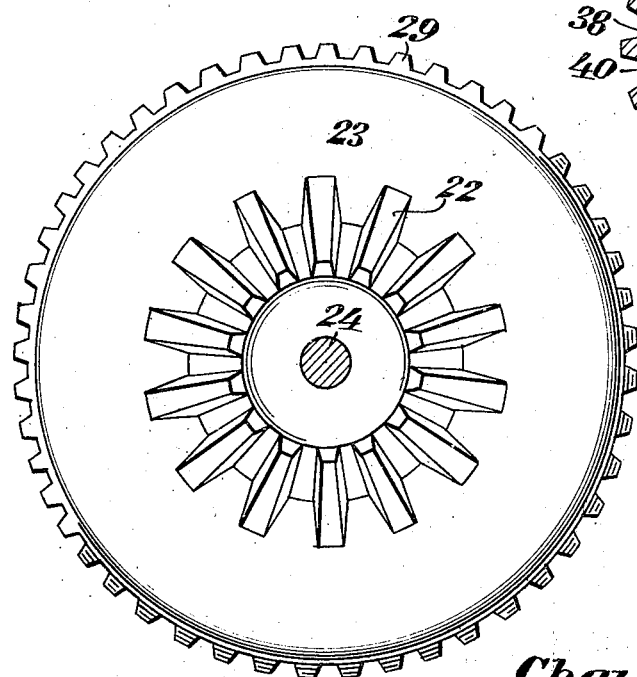
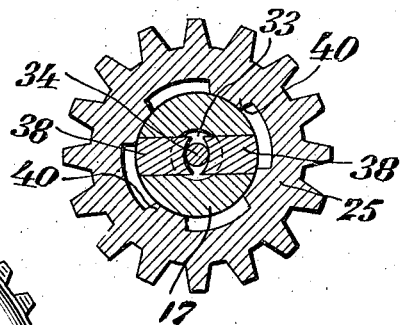
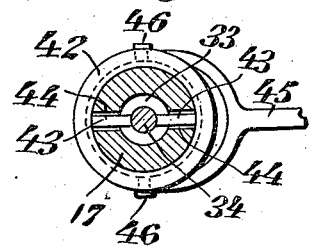
INVENTOR
Chauncey R. Cole
WITNESSES
BY
ATTORNEY

UNITED STATES PATENT OFFICE.

CHAUNCEY R. COLE, OF TULSA, OKLAHOMA.

TRANSMISSION.

1,241,924.      Specification of Letters Patent.      Patented Oct. 2, 1917.

Application filed April 20, 1916. Serial No. 92,498.

*To all whom it may concern:*

Be it known that I, CHAUNCEY R. COLE, a citizen of the United States, residing at Tulsa, in the county of Tulsa and State of Oklahoma, have invented certain new and useful Improvements in Transmissions, of which the following is a specification.

This invention relates to an improved transmission and the principal object of the invention is to provide a transmission so constructed that the rate of speed of the driven shaft with respect to the driving or engine shaft may be varied and to further provide improved means for releasably connecting gears with the engine shaft, the gears being at times held for rotation with the driving shaft but normally left free to rotate upon the shaft.

Another object of the invention is to so construct this transmission that by shifting the adjusting fork or lever in one direction, the machine may be driven forwardly and by moving it in the opposite direction, may be driven rearwardly, one speed being provided for the reverse and four speeds for the forward movement.

Another object of the invention is to so construct the transmission that it will be very compact and comprise a comparatively few number of parts, strongly put together.

This invention is illustrated in the accompanying drawings, wherein:—

Fig. 2 is a vertical transverse sectional view taken along the line 2—2 of Fig. 1.

Fig. 3 is a sectional view taken along the line 3—3 of Fig. 1.

Fig. 4 is a view showing the ring gear forming part of the transmission in elevation.

Fig. 5 is a sectional view taken along the line 5—5 of Fig. 1.

Figure 1:
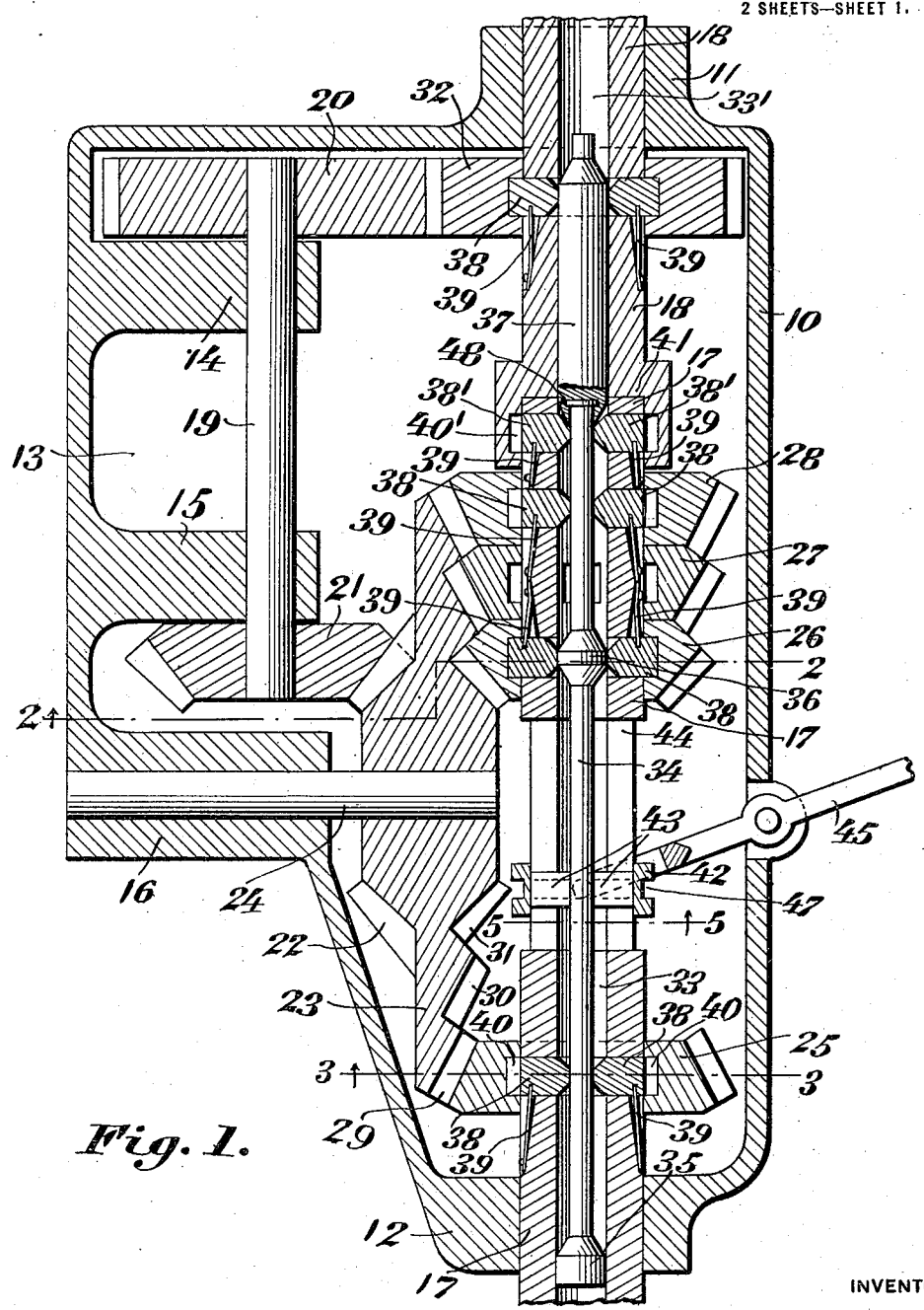
Figure 1 is a longitudinal transverse sectional view through the improved gearing or transmission.

The housing or casing 10 of this transmission is provided with necks forming bearings 11 and 12 and is further provided with a side compartment or extension 13 having bearings 14 and 15 provided therein and having one wall thickened to provide a bearing 16. The driving shaft or engine shaft 17 and transmission shaft or driven shaft 18 enter the housing through the bearings 11 and 12 and are in operative connection with each other for direct drive and for indirect drive through the medium of the speed change mechanism to be hereinafter described. Therefore the speed at which the driven shaft rotates may be controlled and this driven shaft caused to rotate either at the same rate of speed as the driving shaft or it may be caused to rotate either faster or slower than the driving shaft.

A counter-shaft or jack-shaft 19 is rotatably carried by bearings 14 and 15 and carries at one end, a driving gear 20 and at its opposite end a spur gear or beveled gear 21. This beveled gear 21 meshes with the teeth 22 provided upon the rear face of the ring gear 23 which is rotatably mounted in the housing 10 by means of the stub shaft 24 extending into the bearing 16, and it will thus be seen that when this ring gear is rotating, rotary movement will be transmitted to the counter-shaft 19. In order to transmit rotary movement from the driving shaft 17 to the ring gear 23, there has been provided gears 25, 26, 27 and 28 which gears mesh with the teeth 29, 30 and 31 of the ring gear. The gear 25 is the reverse gear and the gears 26, 27 and 28 are speed gears which will rotate the ring gear at varying rates of speed due to the fact that the gears engage the ring gear at different points between the stub shaft 24 and the periphery of this ring gear. This construction can be clearly seen in Fig. 1 and from an inspection of this figure, it will be readily understood that when the gear 26 is operatively connected with the driving shaft 17, the ring gear will rotate at a faster rate of speed, than it will when the gear 28 is operatively connected with the driving shaft. A driving gear 32 is rotatably mounted upon the transmission shaft 18 and meshes with the gear 20 so that when gear 32 is locked upon the transmission shaft, rotary motion will be transmitted to this shaft 18 from the shaft 19.

Within the driving or engine shaft 17 there is provided a longitudinally extending passage 33 which is formed in alinement with a longitudinally extending passage 33′ in the driven shaft or transmission shaft 18. A shifting or adjusting rod 34 is slidably mounted in these alined passageways and is provided with collars or shoulders 35, 36 and 37 which serve to move the lock 38 of the gears into an operative position. These locks 38 are slidably mounted in openings formed in the driving shaft and driven shaft and are yieldably held in an inoperative position by springs 39 so that when the locks are not engaged by the collars or cams 35, 36 and 37, they will move to the position shown in Fig. 3 and thus permit the driving shaft or driven shaft to rotate without the gears being rotated. When the locks are moved outwardly by the cams they will assume the position shown in Fig. 2 and will then engage the abutment lugs 40 thus causing the gears to rotate with the shaft. It should be noted that the cam collar 37 is a relatively long collar and that therefore the gear 32 will at all times be held to rotate with the driven shaft excepting when the locks 38' are moved to engage the abutments 40' formed in the head or housing 41 at the inner end of the driven shaft 18 and also when the locks of the reverse gear 25 are in the operative position. In order to move this adjusting rod there has been provided a ring 42 which is slidably mounted upon the driving shaft and provided with arms 43 extending through slots 44 in the driving shaft to engage the adjusting rod. A shifting lever or fork 45 is pivotally mounted in an opening formed in the casing or housing 10 and is provided with pins or fingers 46 positioned in the grooves 47 of the ring 42 so that this ring can be slid upon the shaft 17 without interfering with its rotation with the shaft.

When this transmission is in use, the driving shaft is rotated and by moving the adjusting rod 34 toward the lower end of Fig. 1, the cams 36 can first be brought into engagement with the locks of gear 28 and then into engagement with the locks of gear 27 and then into engagement with the locks of gear 26 as shown. The speed at which the ring gear 23 rotates will thus be gradually increased and as this ring gear rotates, rotary movement will be transmitted to the counter-shaft 19 through the medium of gear 21 and through the medium of gears 20 and 32 rotary motion will be transmitted to the driven shaft or transmission shaft 18. By moving the lever 45 a greater extent in the same direction, the inner end portion 48 of this cam 37 will move the lock 38' to an operative position and at the same time, the cam 37 will move out of engagement with the locks of gear 32 thus permitting the springs 39 of these locks to move into the inoperative position. The gears 25, 26, 27 and 28 will at that time be all inoperative for transmitting rotary movement to the ring gear 23 and therefore a direct drive will be established from the driving shaft 17 to the driven shaft 18. By moving the lever in the opposite direction, the adjusting rod can be moved outwardly thus decreasing the speed of rotation given shaft 18, or if it is desired to reverse the direction of rotation of shaft 18, the adjusting rod can be moved outwardly the full extent thus bringing the cam 35 into operative engagement with the locks of gear 25. The gear 23 will then be rotated in the opposite direction from which it had originally been driven and the automobile will be moved rearwardly instead of being driven forwardly. It should be noted that at 48 there is provided a swivel joint so that the end portions of the rod 34 may turn at the same speed as the shafts in which they are mounted this reducing frictional wear upon the dogs 38. I have therefore provided a transmission with which the speed can be easily and quickly changed and have further provided a transmission with which the reverse can be easily and quickly thrown into operation.

What I claim is:—

1. A transmission comprising a casing, a driving shaft extending into said casing, a driven shaft extending into said casing, a rod slidably mounted in said shafts and having enlargements forming cam extensions, the portion of the rod normally positioned in said driven shaft being rotatably connected with the remaining portion, means for transmitting rotary motion from the driving shaft to the driven shaft including clutch gears actuated by the cams of said rod.

2. A transmission comprising a casing, a driven shaft extending into said casing, a driving shaft extending into said casing, a rod slidably mounted in said shafts and having enlargements forming actuating cams, the portion of the rod normally positioned in the driven shaft being rotatably connected with the remaining portion, and means for transmitting rotary movement from the driving shaft to the driven shaft including gears loosely mounted upon said driving shaft and locking lugs for said gears carried by said driving shaft and moved to an operative position by the cams of said rod.

In testimony whereof I affix my signature in presence of two witnesses.

CHAUNCEY R. COLE.

Witnesses:
  JOE SANDERS,
  G. P. BARRETT.